Nov. 18, 1969   J. B. MARTIN, JR   3,478,754
APPLICATOR FOR FALSE EYELASHES
Filed April 30, 1968   3 Sheets-Sheet 1
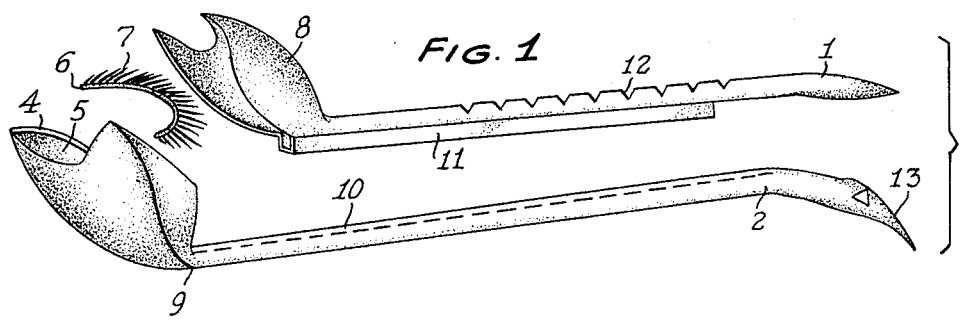
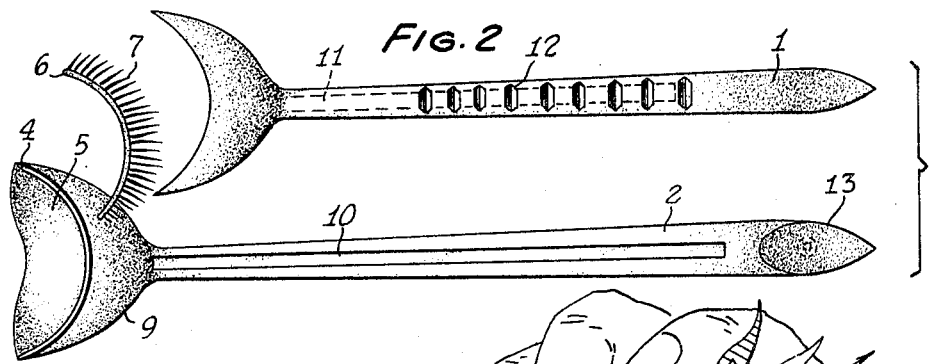
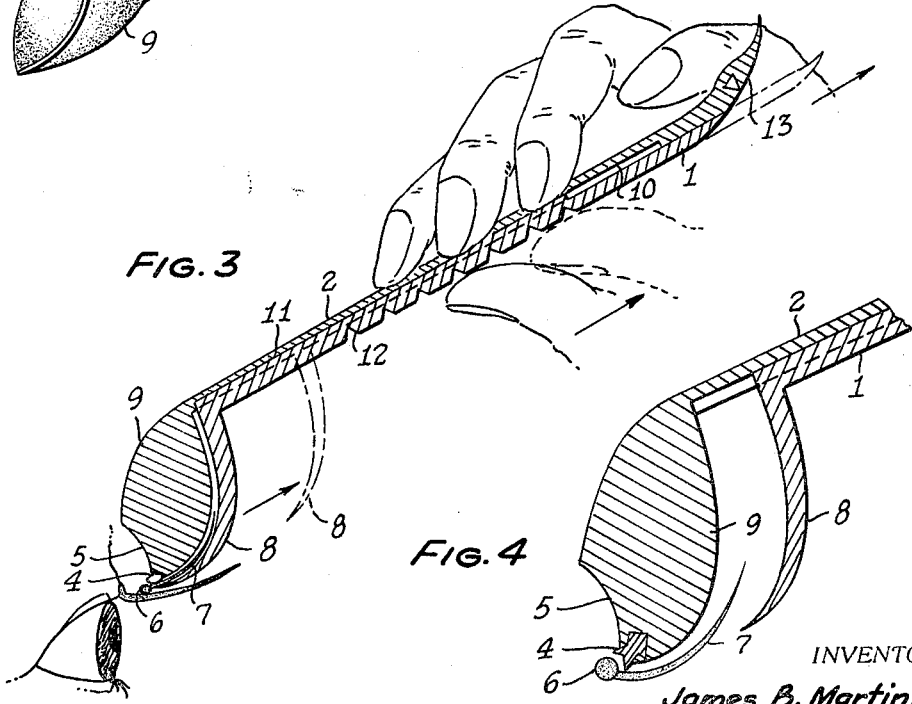
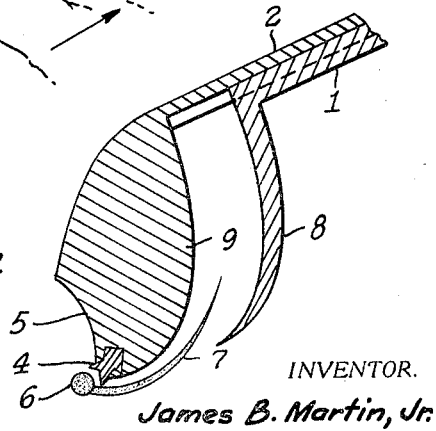
INVENTOR.
James B. Martin, Jr.

Nov. 18, 1969          J. B. MARTIN, JR          3,478,754
                APPLICATOR FOR FALSE EYELASHES
Filed April 30, 1968                         3 Sheets-Sheet 2
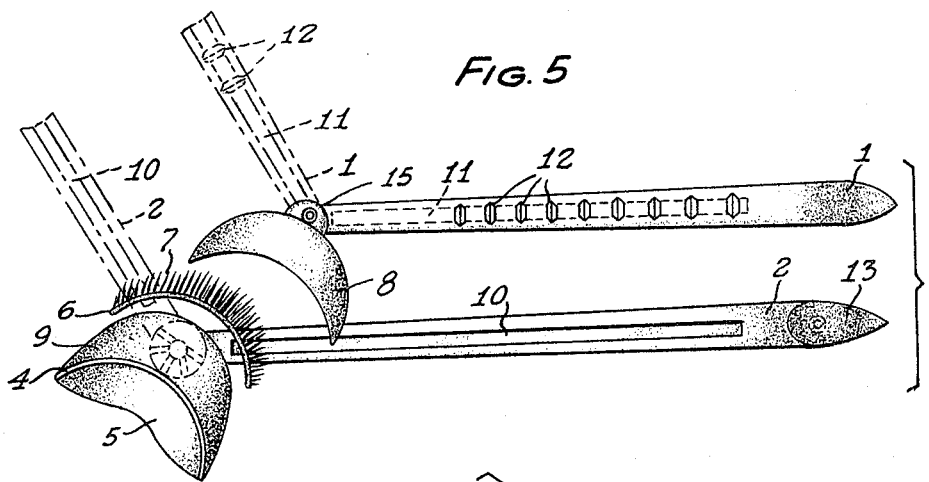
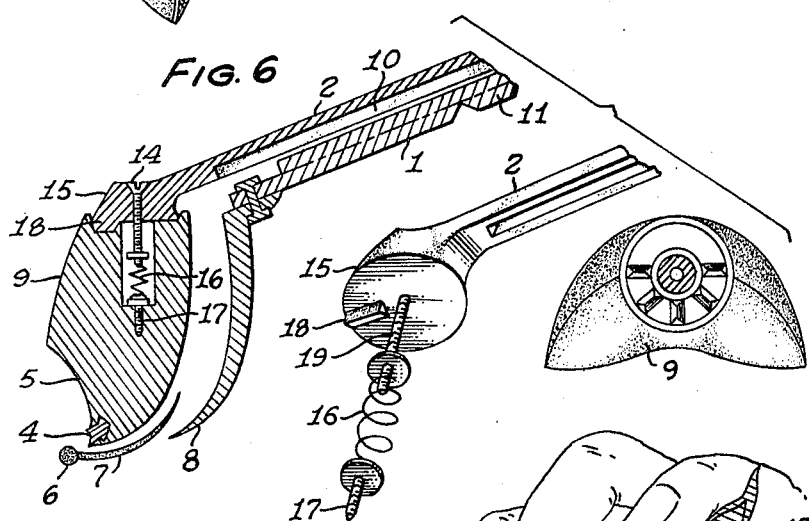
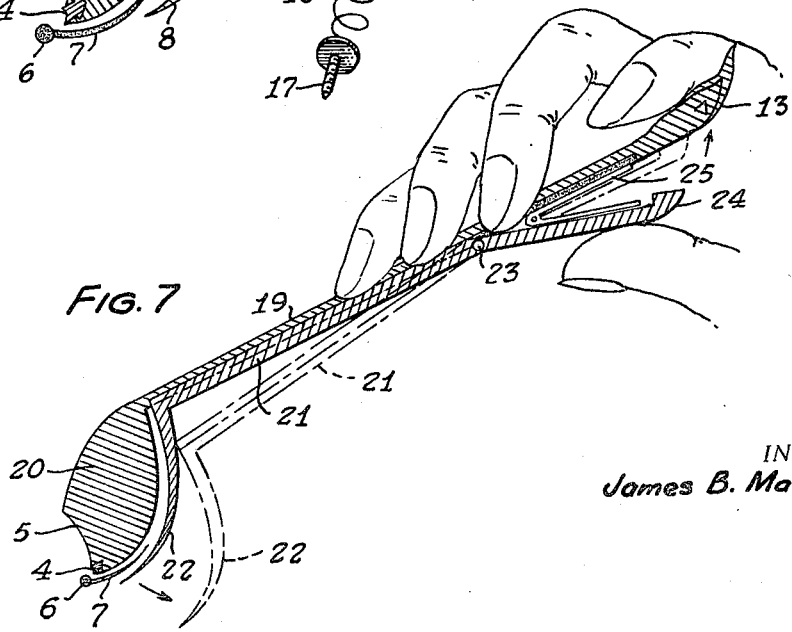
INVENTOR.
James B. Martin, Jr.

Nov. 18, 1969  J. B. MARTIN, JR  3,478,754
APPLICATOR FOR FALSE EYELASHES
Filed April 30, 1968  3 Sheets-Sheet 3
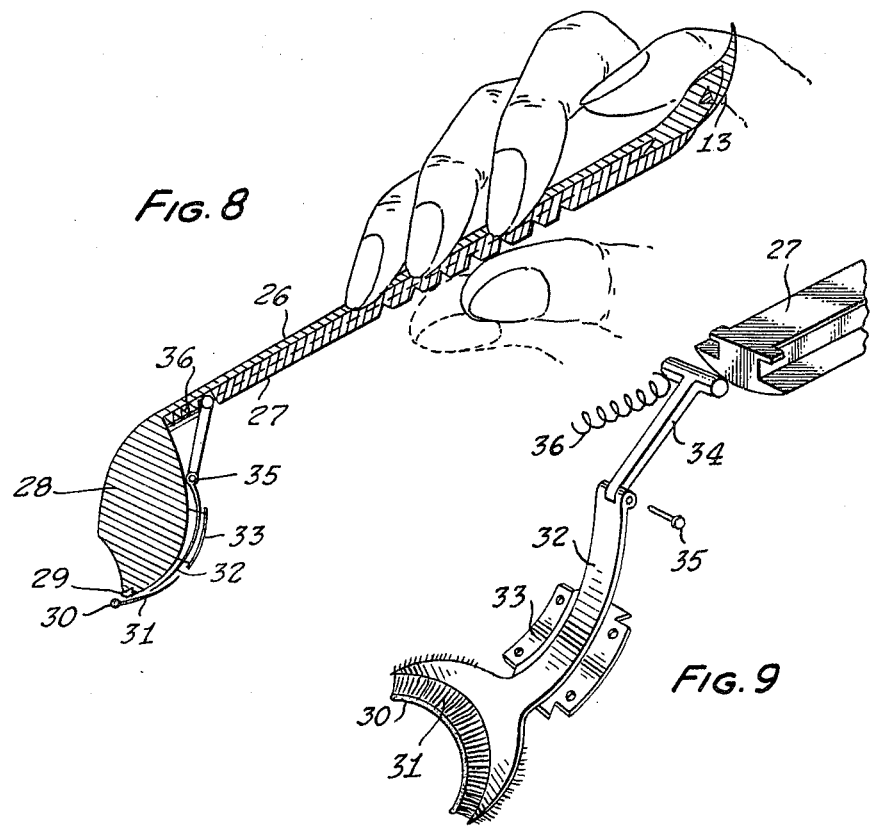
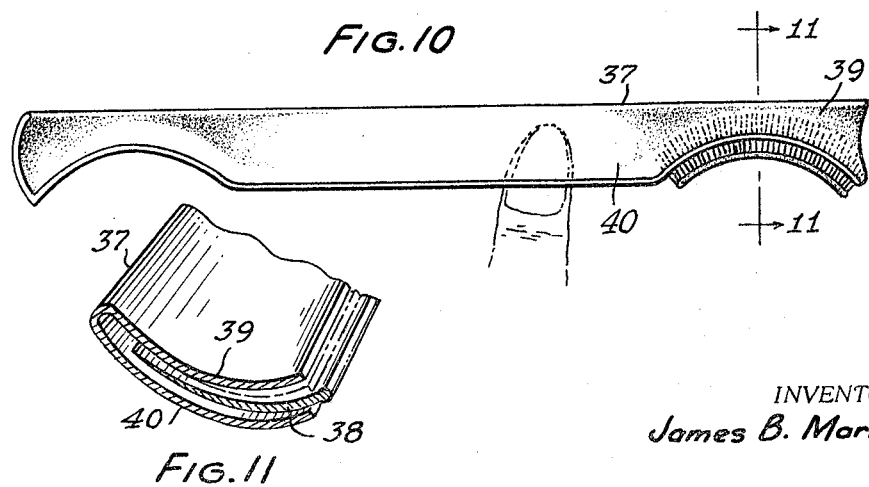
INVENTOR.
James B. Martin, Jr.

United States Patent Office 3,478,754
Patented Nov. 18, 1969

1

3,478,754
APPLICATOR FOR FALSE EYELASHES
James B. Martin, Jr., 2760 NE. 58th St.,
Fort Lauderdale, Fla. 33308
Filed Apr. 30, 1968, Ser. No. 725,443
Int. Cl. A45d 44/00, 40/00
U.S. Cl. 132—1                2 Claims

ABSTRACT OF THE DISCLOSURE

An instrument for applying artificial or false eyelashes to the human eyelid which comprises a pair of intermeshing longitudinally extending handle members having at one end thereof arcuate clamping members adapted to receive the false lash and hold it in position while it is being affixed to the eyelid.

The handle members of the eyelash applicator cooperate to release the pressure of the clamping members on the eyelash to permit its ready disengagement therefrom after the eyelash has been affixed to the human eyelid.

---

My invention relates to an instrument for facilitating the application of artificial eyelashes to the human eyelid in a novel expeditious manner which eliminates the present tedious methods of applying false or artificial eyelashes in place.

Inasmuch as the eye is a delicate and complex component of the human body, it is important that any instrumentality used in conjunction therewith must of necessity be so constructed that while performing the function for which it is intended, will not be a hazard when used by the average person or one not skilled in the act of applying false eyelashes to the human eyelid.

The inventor of this device, being cognizant of the shortcomings and inadequacies of devices for applying artificial or false eyelashes to human eyelids, has evolved an instrument which is practically foolproof, simple in operation and convenient to use without extensive lessons.

An object of my invention is a provision of a novel type of instrument for applying artificial eyelashes to the human eyelid in which the false eyelash is gripped and held in the proper configuration with respect to the human eyelid during the application of the false eyelash.

Another object of my invention is the provision of an instrument of this character, so constructed, while it firmly holds the false lash in proper position, while it is being applied, the lash is readily released from the instrument after it is in position on the eyelid, without disturbing the lash.

Another object of my invention is the provision of an applicator for false eyelashes which is so constructed that when in use an unobstructed view of the eye and eyelid is provided thereby facilitating the use of the instrument and assuring the proper application of the false lash to the eyelid.

A further object of the present invention is the provision of a device for applying false eyelashes to human eyelids which is readily adaptable for either right or left hand use.

A still further object of my invention is the provision of an instrument for applying false eyelashes to the human eyelid which is so constructed that only that portion of the false lash intended for application to the human eyelid is exposed.

A still further object of my invention is the provision of an instrument for applying false eyelashes to the

2 human eyelid, in which the handle portion thereof is pivoted and offset with respect to the clamping portions of the device.

Other objects and features of my invention will be readily apparent from the following detailed description when read in connection with the following drawings of which:

FIGURE 1 is a side elevational exploded view illustrating the two components which comprise the major portions of the preferred form of my invention with a false eyelash depicted in juxtaposition therewith.

FIGURE 2 is a top plan view of the structure shown in FIGURE 1.

FIGURE 3 is a side elevational view, partly in section, illustrating the application of the false eyelash, and the retraction of the means for clamping the false lash.

FIGURE 4 is an enlarged fragmentary view, partly in section, illustrating how the false lash is positioned on the base or cord section of the false lash, which is intended to be secured to the eyelid, is exposed.

FIGURE 5 is a top plan view of the instrument of my invention, in which the handle is pivotally mounted with respect to the clamping portions of the device.

FIGURE 6 is an enlarged sectional exploded view of the components which provide the rotatable means for the handle shown in FIGURE 5.

FIGURE 7 is a side elevational view of a modified form of my invention in which the clamping means for the false eyelash is operated by a portion of the handle which is pivotally mounted on the under side thereof and is spring loaded to maintain the clamping portion thereof in a closed position.

FIGURE 8 is a side elevational view partly in section, in which a toggle action is utilized as an operating means for displacing the false eyelash from the anvil portion of the device, wherein the false lash has been previously secured thereto by means of a temporary adhesive.

FIGURE 9 is an enlarged fragmentary exploded perspective view, showing in detail the toggle mechanism shown in FIGURE 8.

FIGURE 10 is a top plan view of a modified form of my invention wherein a longitudinal member of suitable springlike material and having arcuate cutouts is bent back upon itself and so fabricated that a false eyelash may be positioned between the opposed portions with the base or cordlike portion of the false eyelash exposed for application to the human eyelid.

FIGURE 11 is a fragmentary sectional view taken on line 11—11 of FIGURE 10.

The artificial eyelash as depicted in the drawings heretofore referred to, usually comprises a cordlike base member 6 of arcuate configuration, having secured thereto a plurality of hairs 7 which may be either natural or artificial and which are intended to simulate the natural eyelashes.

The improved eyelash applicator of my invention, as shown and described, is intended to facilitate and expedite the positioning and securing of the false eyelash to the human eyelid, and comprises clamping means for the false eyelash and suitable means for actuating the clamping means which is not cumbersome and is convenient to manipulate by the person applying the eyelashes.

In one form of my invention, as depicted in FIGURES 1, 2, 3 and 4, I have provided a pair of slender longitudinally extending handle members 1 and 2. These members 1 and 2 are provided at one end thereof with suitable cooperating eyelash clamping means 8 and 9, which will be described more in detail further on in the specification and with particular reference to FIGURES 3 and 4.

The handle portions 1 and 2 intermesh to provide a sliding fit therebetween, this is accomplished by providing a longitudinally extending groove 10 in the member 2 and a cooperating boss or rib 11 in the member 1, thereby providing a structure which permits the members 1 and 2 to slide longitudinally with respect to each other to permit the clamping members 8 and 9 to open and close as the handle members 1 and 2 are moved longitudinally with respect to each other. The operation of the member 1 is facilitated by means of suitable corrugations or notches 12 in the handle 1.

As heretofore referred to, the clamping means 8 and 9, as shown in FIGURES 1 and 2 and more in detail in FIGURES 3 and 4, comprise a pair of arcuate shaped cup members 8 and 9 having a configuration which readily accommodates the false eyelash.

As shown the clamping member 8, on the handle portion 1, is concavo-convex in configuration and is adapted to engage the convex surface of the member 9 on the handle member 2 when it is in its closed position as it is shown by the full lines in FIGURE 3, with the leading edge 4 of the surface 5, embracing the cordlike edge 6 of the false eyelash 7. In this figure the eyelash 7 is being applied to the human eyelid and the dot and dash lines in this figure indicate the position the clamping member 8 will assume when it is released after the false eyelash 7 has been secured in position on the human eyelid.

In FIGURE 4 I have shown in detail the position that the clamping means assume after the eyelash 7 has been positioned on the eye and the device of my invention is in the process of being removed from the human eyelid.

As shown I have provided at the free end of the member 2 a false finger nail portion 13 to facilitate the operation of my device.

In FIGURES 5 and 6 I have depicted a modified form of my invention in which the clamping means 8 and 9, as heretofore described, is substantially the same as that disclosed in FIGURES 1, 2, 3 and 4 and the handle members 1 and 2 operate the clamps in the same manner, the primary difference being that the handles 1 and 2 are rotatably adjustable with respect to the members 8 and 9, thereby facilitating the operation of my device from various angles with respect to the eye.

As shown, the handle members 1 and 2 are offset with respect to the clamping members 8 and 9 with the handle portions journaled in the clamping member 9 to provide rotatable motion therebetween. This is accomplished by means of a screw 14 journaled in the end 15 of the handle 2 and loaded with the spring 16, which is secured in place by the screw 17. A stop 18 is provided on the end 15 of the handle 2 for indexing the position of the members 1 and 2 with respect to the clamps 8 and 9.

In a further modified form of my invention, as shown in FIGURE 7, the upper handle member 19 and clamping member 20, is substantially the same as that shown on the member 2 in FIGURES 1 and 4. However, the lower or handle member 2 and its associated clamp 22 is controlled by the pivotal action of the handle 21 which is povted at 23. The member 22 is opened and closed by the action of the handle member 21. Pressure on the upper end 24 of handle 21 against the tension of the spring 25 causes the clamping member 22 to leave the clamping surface 20 thereby relieving the pressure on the eyelash 7 and the ready removal of the applicator from the cyelash, conversely, release of pressure on the end 24 of the member 21 causes the clamp 22 to engage the clamp portion 20 to firmly hold the false eyelash therebetween. The dot and dash lines in this figure depict the position the handle 21 and its associated clamping portion 22 will assume when pressure is released.

As depicted in FIGURES 8 and 9 I have disclosed a further modification of my invention in which the false eyelash is not clamped between meeting surfaces but is temporarily maintained in position on the applicator by means of a self adhesive, such as gum arabic or a similar material, until such time as it is applied to the eyelid.

As shown in FIGURES 8 and 9, like the applicator heretofore described, I have provided a handle member which comprises two longitudinally extending cooperating members 26 and 27. The member 27 is slidably mounted with respect to the member 26 and is confined in juxtaposition therewith.

Located on the end portion of the member 26, and similar in configuration to the clamp portion 9 as previously described, with respect to FIGURES 1 to 7 inclusive, is an arcuate shaped base member or anvil 28, having extending from the lower edge thereof a resilient boss or ridge 29. This boss is intended to engage the cord or base portion 30 of the eyelash 31 to facilitate the application of the false eyelash to the human eyelid by exerting uniform pressure to the false lash as it is pressed against the human eyelid after a suitable non-irritating adhesive has been applied to the cord or edge 30 of the false lash 31.

In my proposed modification as shown in FIGURES 8 and 9, I do not secure the eyelash 31 to the member 28 by mechanical clamping means but secure it thereto by a suitable temporary adhesive.

After the false eyelash 31 has been secured to the eyelid it is readily removed from the member 28 by the sliding action of the member 32. The sliding member 32 is confined in the channel member 33 which is secured to the rear surface of the anvil 28. Inasmuch as the adhesive which secures the lash to the anvil 28 is of a non-permanent type the member 32 readily disassociates the lash from the anvil 28 as it slides between the anvil and the eyelash.

The action of the member 32 is controlled by the operation of the handle portion 27 which is connected thereto by the link member 34 and stud 35. A spring 36 for retracting the member 32 is provided for biasing the action of the member 27 and its associated parts.

In FIGURES 10 and 11 I have illustrated a modified form of false eyelash applicator which comprises an elongated member 37 constructed of springlike material bent back upon itself to provide a substantially U cross section as shown in FIGURE 11. In using this device for applying false eyelashes the lash 38 is positioned between the opposed surfaces 39 and 40 and held in position while it is being applied to the eyelid, by pressure applied by the fingers to the outer surfaces of the portions 39 and 40. After the false lash is in position on the eyelid, release of the pressure on the surfaces 39 and 40 permits its ready removal without disturbing the false lash.

It will be noted that the novel structure of this modification permits its use on either the right or left eye and also by a right or left handed person.

While I have shown and described the preferred embodiment of my invention it is understood that various changes and modifications may be made therein without departing from the spirit of the invention.

What is claimed is:

1. An instrument for applying artificial eyelashes to the human eyelid comprising in combination, a pair of arcuate intermeshing longitudinally extending upper and lower handle members to provide a unitary structure, the meeting surfaces of said members having a longitudinal rib on the lower member and a groove on the upper member, wherein said members are confined in engagement with each other, with said rib in engagement with said groove, arcuate shaped clamping means, concavo-convex in configuration, integral with said handle members at one end thereof and in juxtaposition with respect to each other for clamping said artificial eyelash therebetween, the clamping and releasing action of said clamping means controlled by the sliding action of said lower handle member with respect to the upper handle member, said clamping member on said upper handle member embracing said eyelid.

2. An instrument for applying artificial eyelashes to the human eyelid as exemplified in claim 1 characterized in this that the longitudinally extending handle members are rotatably mounted on the clamping members for adjusting said members, with respect thereto to facilitate the use of the device of this invention.

References Cited

UNITED STATES PATENTS 2,411,519  11/1946  Byron ---------------- 132—1

FOREIGN PATENTS

| 947,341 | 1/1949 | France. |
| 1,021,063 | 2/1966 | Great Britain. |
| 56,773 | 7/1952 | France. |
| 780,048 | 1/1935 | France. |
| 930,417 | 8/1947 | France. |

LOUIS G. MANCENE, Primary Examiner

G. E. McNEILL, Assistant Examiner

U.S. Cl. X.R.

132—79.1